(12) United States Patent
Tanaka et al.

(10) Patent No.: US 9,563,629 B2
(45) Date of Patent: Feb. 7, 2017

(54) INFORMATION PROCESSING APPARATUS AND INFORMATION PROCESSING METHOD

(75) Inventors: Keisuke Tanaka, Chiba (JP); Hiroshi Nagatani, Tokyo (JP); Hirotaka Takahashi, Tokyo (JP); Tatsuo Kuroiwa, Tokyo (JP)

(73) Assignee: Sony Corporation (JP)

( * ) Notice: Subject to any disclaimer, the term of this patent is extended or adjusted under 35 U.S.C. 154(b) by 523 days.

(21) Appl. No.: 12/807,017

(22) Filed: Aug. 26, 2010

(65) Prior Publication Data

US 2011/0055718 A1 Mar. 3, 2011

(30) Foreign Application Priority Data

Aug. 31, 2009 (JP) .................. P2009-200872

(51) Int. Cl.
*G06F 3/01* (2006.01)
*G06F 17/30* (2006.01)

(52) U.S. Cl.
CPC ..... *G06F 17/30011* (2013.01); *G06F 17/3028* (2013.01)

(58) Field of Classification Search
CPC ........ G06F 3/00; G06F 3/01; G06F 17/30011; G06F 17/3028
USPC .................................. 715/744, 747
See application file for complete search history.

(56) References Cited

U.S. PATENT DOCUMENTS

| | | | | |
|---|---|---|---|---|
| 6,910,035 B2* | 6/2005 | Hoekman | ......... | G06F 17/30038 |
| 7,363,591 B2* | 4/2008 | Goldthwaite | ...... | H04N 5/44543 348/E5.105 |
| 7,689,933 B1* | 3/2010 | Parsons | ................. | G06F 3/0482 715/200 |
| 7,814,212 B1* | 10/2010 | Chan | .................... | H04L 12/6418 709/227 |
| 2004/0218894 A1* | 11/2004 | Harville | ............ | G06F 17/30241 386/241 |
| 2005/0034084 A1* | 2/2005 | Ohtsuki | .................. | G06T 15/04 715/864 |
| 2005/0149872 A1* | 7/2005 | Fong | ...................... | G06F 3/0481 715/727 |
| 2006/0168126 A1* | 7/2006 | Costa-Requena | ... | H04L 12/2803 709/219 |
| 2006/0265403 A1* | 11/2006 | Mercer | ............. | G06F 17/30056 |
| 2007/0081744 A1* | 4/2007 | Gokturk | ............ | G06F 17/30253 382/305 |

(Continued)

FOREIGN PATENT DOCUMENTS

| | | | |
|---|---|---|---|
| JP | 2005175839 A | 6/2005 | |
| JP | 2007164269 A | 6/2007 | |

(Continued)

OTHER PUBLICATIONS

Japanese Office Action for JP Application No. 2014190190, dated Jun. 23, 2015.

*Primary Examiner* — Anil Bhargava
(74) *Attorney, Agent, or Firm* — Lerner, David, Littenberg, Krumholz & Mentlik, LLP

(57) ABSTRACT

A system and method for recommending content to a user. In embodiments of the system and method, one or more content groups is generated, at least one of the content groups including more than one type of content, and a display indicative of the one or more content groups is presented to the user.

20 Claims, 8 Drawing Sheets

(56) References Cited

U.S. PATENT DOCUMENTS

| | | | | |
|---|---|---|---|---|
| 2007/0169613 | A1* | 7/2007 | Kim | G10H 1/00 84/609 |
| 2008/0040354 | A1* | 2/2008 | Ray | G06F 17/30035 |
| 2008/0091717 | A1* | 4/2008 | Garbow | G06F 17/30749 |
| 2008/0189660 | A1* | 8/2008 | Nakagawa | G06F 17/30056 715/840 |
| 2008/0195654 | A1* | 8/2008 | Weare | G06F 17/30598 |
| 2008/0209351 | A1* | 8/2008 | Macadaan | G06F 3/0482 715/762 |
| 2009/0049479 | A1* | 2/2009 | Green | H04N 5/44543 725/46 |
| 2009/0063976 | A1* | 3/2009 | Bull | G06F 17/30053 715/716 |
| 2009/0150797 | A1* | 6/2009 | Burkholder | G06F 17/30056 715/747 |
| 2009/0248546 | A1* | 10/2009 | Norris | G06Q 30/0601 705/26.1 |
| 2009/0313303 | A1* | 12/2009 | Spence | G06F 17/30053 |
| 2009/0313432 | A1* | 12/2009 | Spence | G06F 17/30053 711/115 |
| 2010/0333129 | A1* | 12/2010 | Alhadeff | G06Q 30/02 725/27 |
| 2011/0004826 | A1* | 1/2011 | Cho | H04H 20/26 715/716 |
| 2011/0022500 | A1* | 1/2011 | Scheinfeld | G06Q 20/12 705/27.2 |

FOREIGN PATENT DOCUMENTS

| | | | |
|---|---|---|---|
| JP | 2008146191 A | 6/2008 | |
| JP | 2008250605 A | 10/2008 | |

\* cited by examiner

INFORMATION PROCESSING APPARATUS AND INFORMATION PROCESSING METHOD

CROSS-REFERENCE TO RELATED APPLICATION

The present application claims priority from Japanese Patent Application JP 2009-200872 filed in the Japanese Patent Office on Aug. 31, 2009, the entire content of which is hereby incorporated herein by reference.

BACKGROUND OF THE INVENTION

Field of the Invention

The present invention relates to an information processing apparatus and an information processing method.

Description of the Related Art

In recent years, a variety of content such as photo, video, music have been used as digital content. On the other hand, with an increase in the capacity of a storage medium and an increase in the bandwidth of a communication line, we have become able to handle a large amount of content.

When a user selects desired content from a plurality of content, there are a method of visually selecting the desired content from a list indicating the content of the plurality of content, and a method of searching for the desired content by using metadata ancillary to the digital content, for example. However, in the former case, when the number of content is large, it is difficult to find the desired content. Moreover, in the latter case, only the result matching the keyword thought of by the user can be derived, so that the user may end up always selecting the same content. Accordingly, there is proposed a method of selecting content to be recommended for the user by using user's preference information and history information, for example.

SUMMARY OF THE INVENTION

However, the method of selecting content to be recommended for the user in the related art premises that the user itself desires playback of a specific type of content such as music. Thus, there was an issue that only the content selected from the same type of content using a single algorithm was provided.

In particular, for example, in an application for managing multimedia such as music, video and photo, if content groups to be recommended for the user can be provided one after another from a variety of content by using a variety of algorithms, it is conceivable that the application is used in a way totally different from the past, which is, for example, that the user launches the application with a motive such as "there may be something enjoyable" even without a specific objective such as "to listen to music" or "to see photos".

In light of the foregoing, it is desirable to provide an information processing apparatus and an information processing method which are novel and improved, and which are capable of creating a content group including various types of content by using a variety of algorithms and providing the content group. The present system and method is provided with these desires in mind.

The present system and method includes embodiments for recommending content to a user. In such embodiments, one or more content groups is generated, at least one of the content groups including more than one type of content, and a display indicative of the one or more content groups is presented to the user.

According to the embodiments described above, the content group including various types of content can be created by using a variety of algorithms and can be provided.

DETAILED DESCRIPTION OF THE EMBODIMENT

Figure 1:
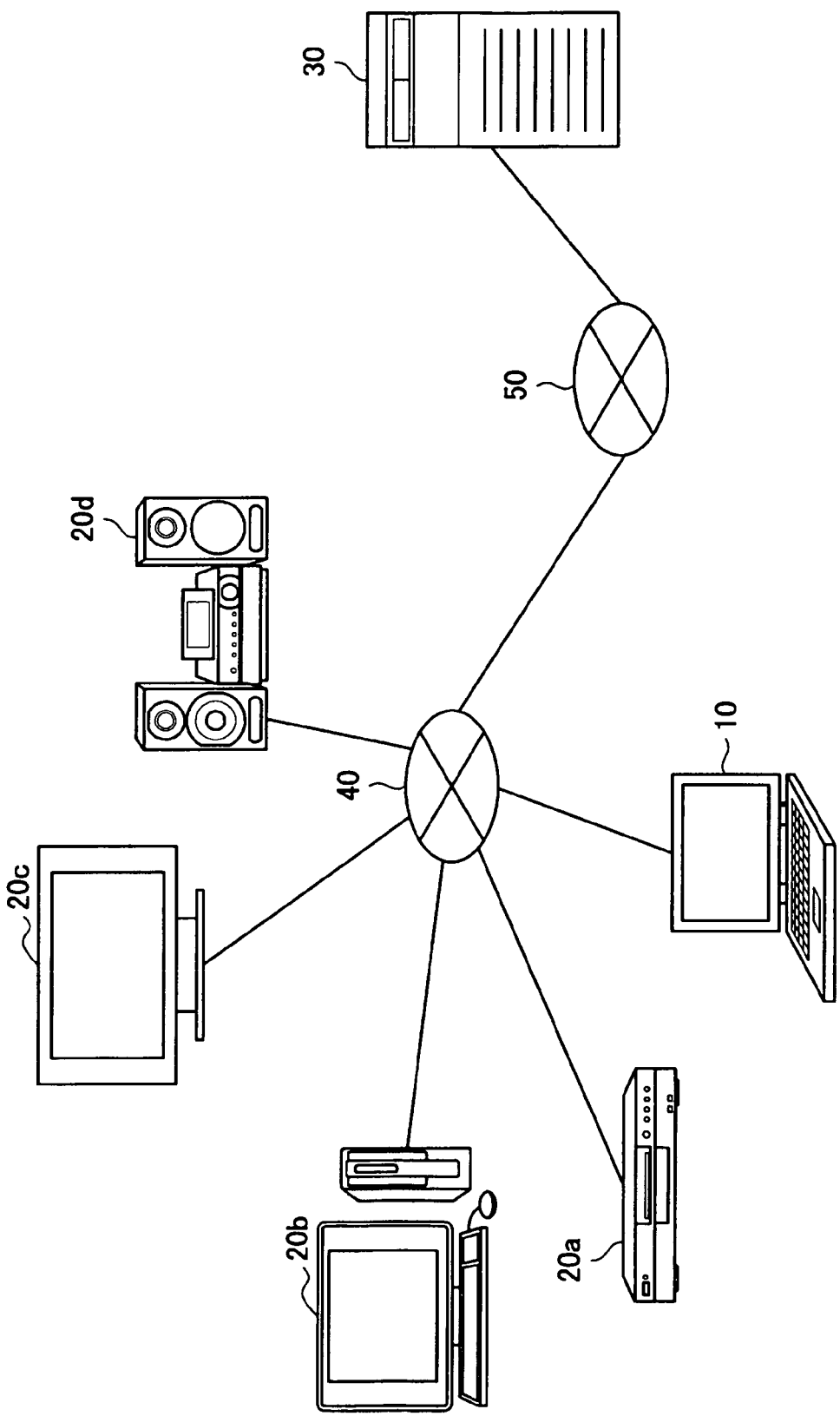
FIG. 1 is an explanatory diagram showing a schematic configuration of an information processing system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order.

1. Outline of information processing system
2. Functional configuration of information processing apparatus
3. Hardware configuration of information processing apparatus
4. Operation for home screen display of information processing apparatus
5. Operation for player screen display of information processing apparatus 1. Outline of Information Processing System First, a schematic configuration of an information processing system according to an embodiment of the present invention will be described with reference to FIG. 1. FIG. 1 is an explanatory diagram showing the schematic configuration of the information processing system according to the embodiment of the present invention.

The information processing system according to the embodiment of the present invention mainly includes an information processing apparatus 10, a home server 20, and an external content providing server 30 and each of the apparatus is connected via a home network 40 or a communication network 50.

The information processing apparatus 10 is a device including a function to play content such as a photo, a video and music. As an example of the information processing apparatus 10, a PC (Personal Computer) is shown in FIG. 1. The information processing apparatus 10 is connected to the home server 20 via the home network 40. Moreover, the information processing apparatus 10 is connected to the external content providing server 30 via the communication network 50 such as the Internet, for example.

Here, the home server 20 is connected to the home network 40 and is, for example, a device including a storage unit for storing therein content such as a photo, a video and music and having a function as a server. Examples of the home server 20 include a recorder 20a, a PC 20b, a television 20c, and an audio player 20d. Here, the home server 20 functions as a server but may have a function as a client at the same time.

Moreover, the content providing server 30 is connected to the communication network 50 and is, for example, a device for providing content such as photo content, music content, news content, and product information content.

The home network 40 is a closed network in a unit such as a home. For example, the home network 40 may be a network configured according to DLNA (Digital Living Network Alliance).

The communication network 50 is a wired or wireless transmission line. For example, the communication network 50 may include a public network such as a telephone network, a satellite communication network, or the Internet, and/or a leased line network such as various LANs (Local Area Networks) including Ethernet (registered trademark), a WAN (Wide Area Network) or an IP-VPN (Internet Protocol-Virtual Private Network).

2. Functional Configuration of Information Processing Apparatus

Figure 2:
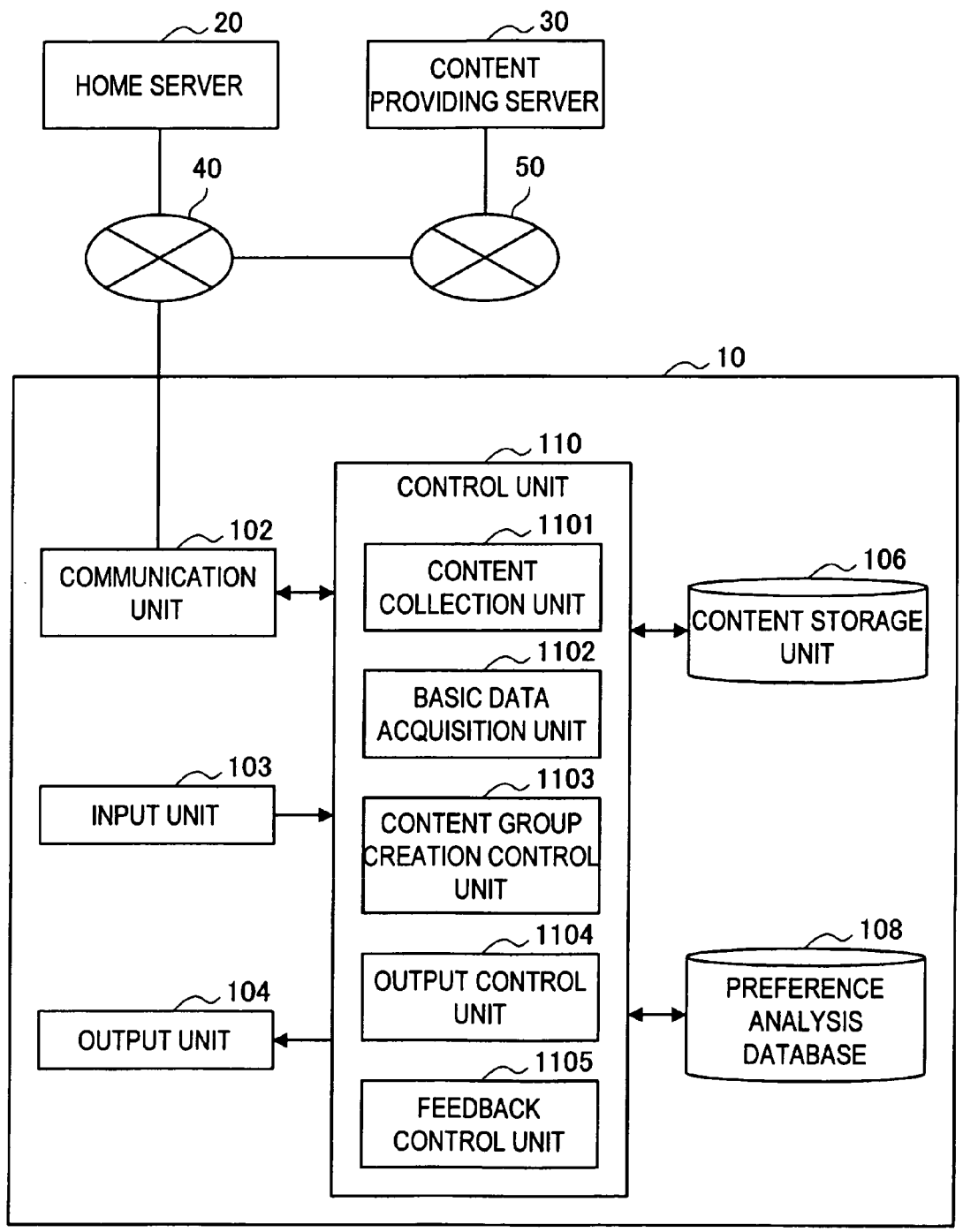
FIG. 2 is a block diagram showing an internal functional configuration of an information processing apparatus according to the embodiment.

Next, an internal functional configuration of the information processing apparatus 10 will be described with reference to FIG. 2. FIG. 2 is a block diagram showing the internal functional configuration of the information processing apparatus according to the embodiment.

The information processing apparatus 10 mainly includes a communication unit 102, an input unit 103, an output unit 104, a content storage unit 106, a preference analysis database 108, and a control unit 110.

The communication unit 102 is a communication interface having a function to connect to an external device via a network. In the present embodiment, the communication unit 102 connects to the home network 40 and the communication network 50 and has a function to communicate with the home server 20 and the content providing server 30.

The input unit 103 is a functional unit for receiving an input operation of a user on the information processing apparatus 10. The input unit 103 includes, for example, an input device such as a mouse or a keyboard and an input control circuit for generating an input signal based on the input by the user and for outputting the signal to the control unit 110. Moreover, in the case where the input device is an external device, the input unit 103 may include a connection interface with the input device and the input control circuit.

The output unit 104 may include a display device, an audio output device and the like or may include an output interface to the display device and the audio output device, a data conversion circuit and the like. In the present embodiment, the output unit 104 displays information and outputs sound to the user according to the control of an output control unit 1104.

The content storage unit 106 is a storage unit for storing therein content data such as photo content, video content and music content, for example. The content storage unit 106 may be a recording medium such as a HDD (Hard Disk Drive) or a flash memory, for example.

The preference analysis database 108 is a database that has accumulated user's preference information. The preference analysis database 108 accumulates, based on the content selected by the user, information indicating a trend of the content preferred by the user. Moreover, search history information in the Internet or the like may be used, for example. In the present embodiment, information of the played content is reflected in the preference analysis database 108.

The control unit 110 has a function to control the overall operations within the information processing apparatus according to a variety of programs. In the present embodiment, the control unit 110 has a function to control the operations of the communication unit 102, the input unit 103, the output unit 104, the content storage unit 106, and the preference analysis database 108. Moreover, the control unit 110 mainly includes a content collection unit 1101, a basic data acquisition unit 1102, a content group creation control unit 1103, the output control unit 1104, and a feedback control unit 1105. These functional units are separated just for the convenience of the description, and thus the operations of the plurality of functional units may be described in the same program or, as a matter of course, in different programs, and also a way of separation can be variously designed.

The content collection unit 1101 has a function to collect a plurality of types of content to be provided for the user. The content collection unit 1101 may collect various types of content stored in the home server 20 via the communication unit 102 and the home network 40 as well as collect content from the content storage unit 106. Moreover, the content collection unit 1101 may collect content stored in the content providing server 30 via the communication unit 102 and the communication network 50. At this time, the content collection unit 1101 may collect content only from a preset content providing server 30 or may collect content by searching for the content providing server 30 from which the content can be collected.

The basic data acquisition unit 1102 has a function to obtain basic data for setting a creation logic. The basic data acquisition unit 1102 may obtain necessary basic data according to a situation. Here, the example of the basic data include date and time information, preference information stored in the preference analysis database 108, meta data of the content collected by the content collection unit 1101, and meta data of the content on play.

The content group creation control unit 1103 creates a content group in which content to be recommended for the user is assembled from a plurality of content having been collected by the content collection unit 1101. At this time, the content group creation control unit 1103 refers to the basic data obtained by the basic data acquisition unit 1102, chooses an algorithm, and sets the creation logic for creating the content group. Then, the content group creation control unit 1103 creates the content group including a plurality of types of content from the collected plurality of content by using the algorithm based on the set creation logic.

In the case of providing only one content group at a time to the user, the content group creation control unit 1103 sets, at the time of setting the creation logic, the creation logic so that the creation logic randomly changes at each time of the content group creation. In this case, the content group creation control unit 1103 may store several records of the creation logics and may set the creation logic by using the information so that the creation logic randomly changes.

Moreover, the content group creation control unit 1103 may set the creation logic by using an existing algorithm for random selection. Further, the content group creation control unit may randomly choose an algorithm to use for creating one or more content groups.

Moreover, in the case of providing a plurality of content groups at a time to the user, the content group creation control unit 1103 may set the creation logic and the algorithm by further considering the creation logics of the other content groups in the plurality of content groups provided at each time of the content group creation. For example, the content group creation control unit 1103 sets the creation logics so that the creation logics of the plurality of content groups displayed at a time are not duplicated.

Furthermore, when the content group creation control unit 1103 has detected that the user has input a content group re-creation instruction by using the input unit 103, the content group creation control unit 1103 sets an algorithm and a creation logic again and creates a content group.

The output control unit 1104 controls the output of an image to the display device and the output of sound to the audio output device, for example. Moreover, the output control unit 1104 may also control playback (decode) processing for the output as necessary. Here, the display device and the audio output device may be embedded in the information processing apparatus 10 or may be externally connected to the information processing apparatus 10.

The feedback control unit 1105 gives feedback of the user's input information to the preference information. For example, when the user selects a content group to be played from the displayed content groups, information on the selection is converted into data in a form storable in the preference analysis database 108 and stores the data in the preference analysis database 108.

3. Hardware Configuration of Information Processing Apparatus

Figure 3:
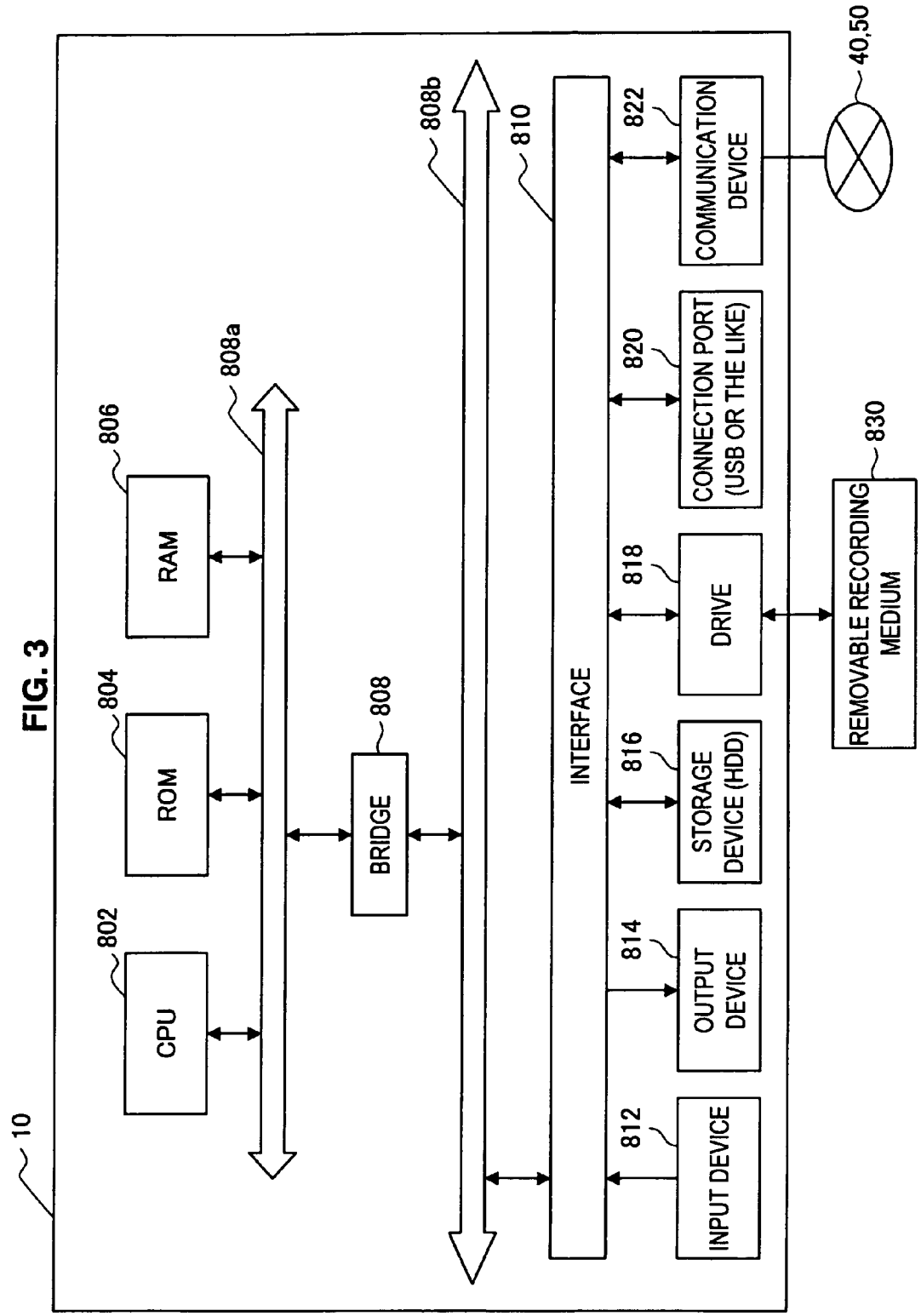
FIG. 3 is a block diagram showing a hardware configuration of the information processing apparatus according to the embodiment.

There has been described above the functional configuration of the information processing apparatus 10 according to the present embodiment. Next, there will be described here an example of a hardware configuration for realizing each of the functions of the information processing apparatus 10 according to the present embodiment. FIG. 3 is a block diagram showing the example of the hardware configuration of the information processing apparatus 10 according to the embodiment of the present invention.

The information processing apparatus 10 includes a CPU (Central Processing Unit) 802, a ROM (Read Only Memory) 804, a RAM (Random Access Memory) 806, and a host bus 808a. Furthermore, the information processing apparatus 10 includes a bridge 808, an external bus 808b, an interface 810, an input device 812, an output device 814, a storage device (HDD) 816, a drive 818, a connection port 820, and a communication device 822.

The CPU 802 functions as an arithmetic processing device and a control device and controls the overall operations within the apparatus according to a variety of programs. Moreover, the CPU 802 may be a microprocessor. The ROM 804 stores therein programs, calculation parameters and the like used by the CPU 802. The RAM 806 temporarily stores therein programs used in the execution of the CPU 802 and parameters that change appropriately in the execution, and the like. These are interconnected via the host bus 808a including a CPU bus and the like. The CPU 802 executes the programs stored in the ROM 804, the storage device 816 and the like, thereby executing processing performed in each of the blocks in FIG. 6 and FIG. 8, for example. The CPU 802 corresponds to the control unit 110 in FIG. 2.

The host bus 808a is connected to the external bus 808b such as a PCI (Peripheral Component Interconnect/Interface) bus via the bridge 808. In addition, the host bus 808a, the bridge 808, and the external bus 808b are not necessarily configured separately and the functions thereof may be mounted on one bus.

The input device 812 includes, for example, an input means for a user to input information, such as a mouse, a keyboard, a touch panel, a button, a microphone, a switch, and a lever, and an input control circuit for generating an input signal based on the input by the user and for outputting the input signal to the CPU 802. By performing a variety of operations with the input device 812, various types of data can be input and an instruction for processing operation can be given. The input device 812 corresponds to the input unit 103 in FIG. 2.

The output device 814 includes, for example, a display device such as a CRT (Cathode Ray Tube) display device, a liquid crystal display (LCD) device, an OLED (Organic Light Emitting Display) device and a lamp, and an audio output device such as a speaker and a headphone. The output device 814 outputs reproduced content, for example. Specifically, the display device displays a variety of information such as reproduced video data in the form of text or image. On the other hand, the audio output device converts reproduced audio data or the like into sound and outputs the sound. The output device 814 corresponds to the output unit 104 in FIG. 2.

The storage device 816 includes a HDD (Hard Disk Drive), for example. The storage device 816 drives the HDD and stores therein the programs or various types of data executed by the CPU 802. Moreover, the storage device 816 may include a storage medium, a recording device for recording data in the storage medium, a reading device for reading out the data from the storage medium, and a deleting device for deleting the data recorded in the storage medium. The storage device 816 may correspond to the content storage unit 106 and the preference analysis database 108 in FIG. 2.

The drive 818 is a reader/writer for storage medium and is embedded or attached outside. The drive 818 can read and write data from and to an attached removable recording medium such as a magnetic disk, an optical disk, a magneto-optical disk, or a semiconductor memory. In addition, the content storage unit 106 and the preference analysis database 108 in FIG. 2 may be realized as the removable recording medium from and to which the data is read and written by the drive 818.

The connection port 820 is an interface connected to an external device and may be a connection port capable of transmitting data to the external device via a HDMI, for example.

The communication device 822 is a communication interface including a communication device for connecting to the home network 40 and the communication network 50, for example. Moreover, the communication device 822 may be a communication device compatible with a wireless LAN (Local Area Network), a communication device compatible with a wireless USB, or a wire communication device that performs wired communication. The communication device 822 realizes the communication function of the communication unit 102 in FIG. 2.

4. Operation for Home Screen Display of Information Processing Apparatus

Figure 4:
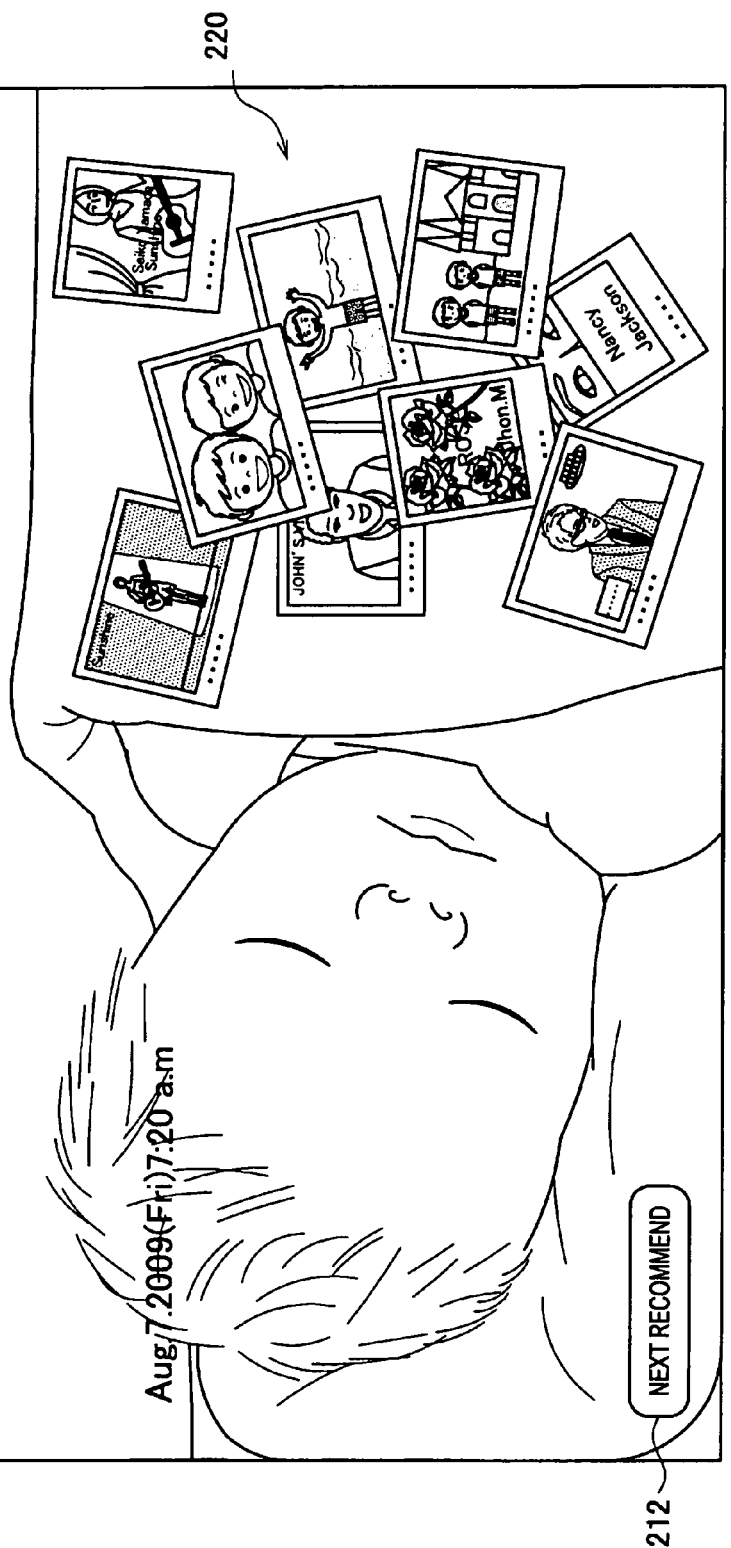
FIG. 4 is an explanatory diagram showing an example of a home screen displayed by the information processing apparatus according to the embodiment.
Figure 5:
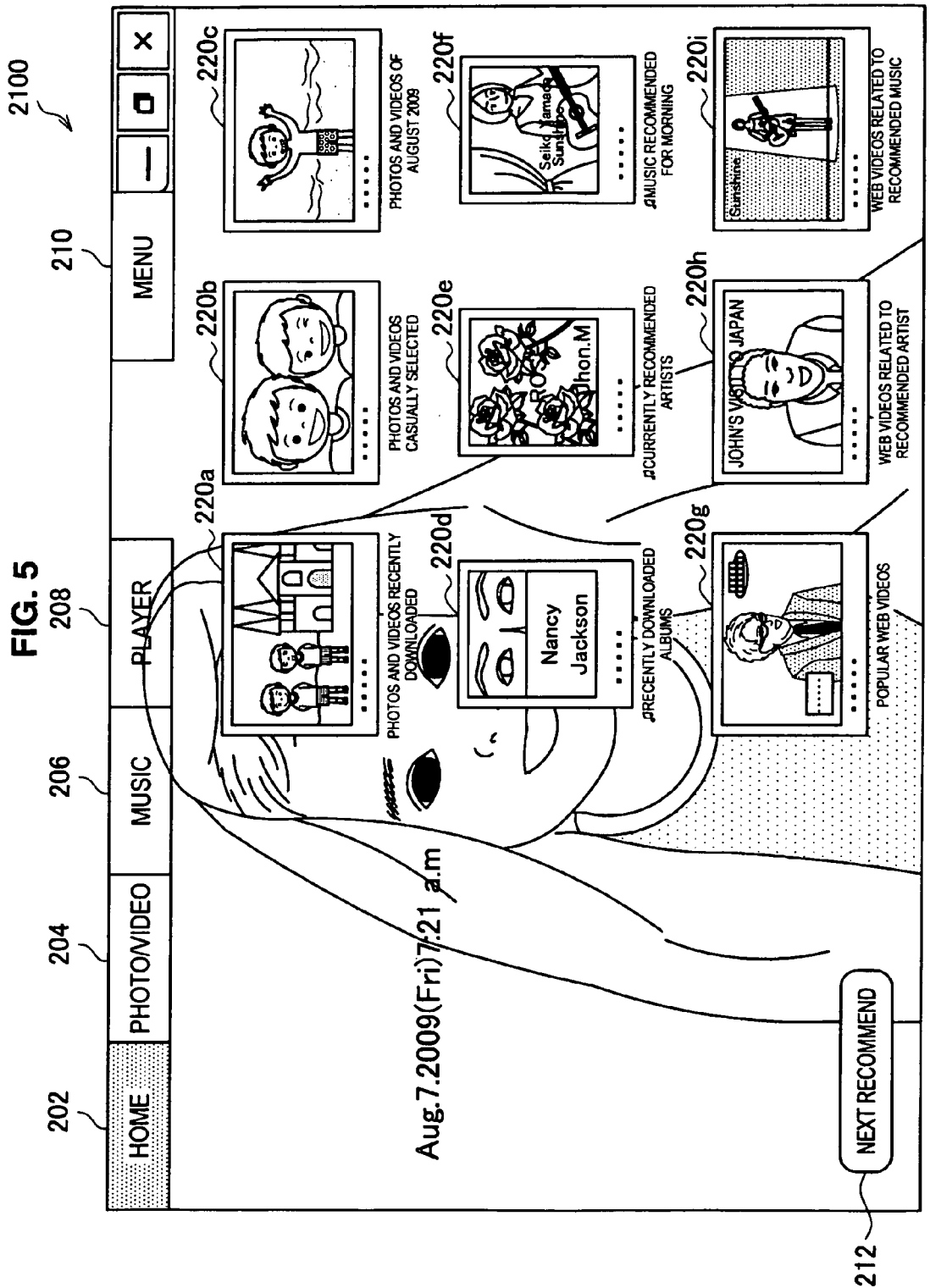
FIG. 5 is an explanatory diagram showing another example of the home screen displayed by the information processing apparatus according to the embodiment.
Figure 6:
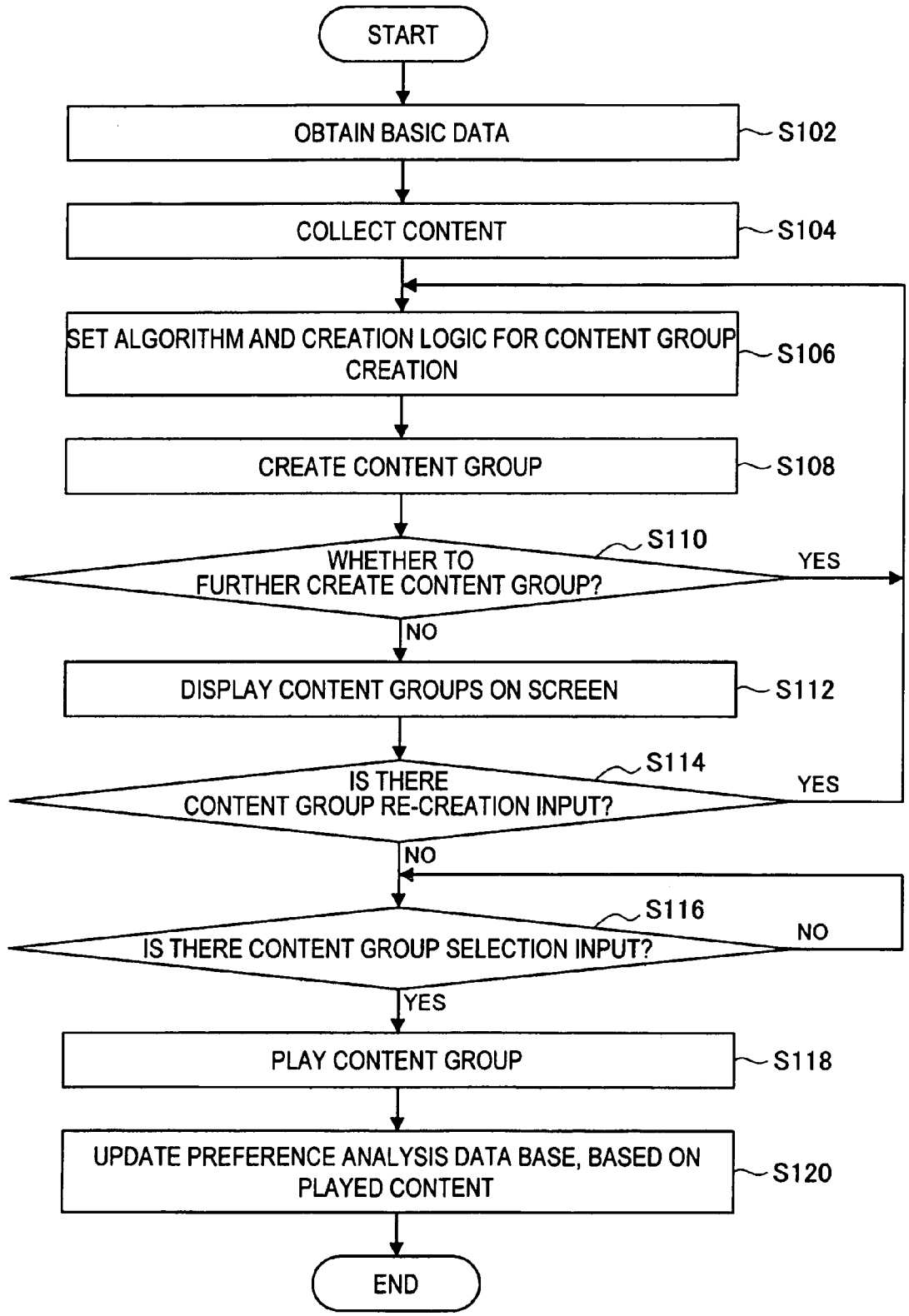
FIG. 6 is a flowchart showing an operation at the time when the information processing apparatus according to the embodiment displays the home screen.

Next, an operation of the information processing apparatus 10 according to the present embodiment at the time of displaying a home screen will be described by using FIGS. 4 to 6. FIG. 4 is an explanatory diagram showing an example of the home screen displayed by the information processing apparatus 10 according to the embodiment of the present invention. FIG. 5 is an explanatory diagram showing another example of the home screen displayed by the information processing apparatus 10 according to the embodiment of the present invention. FIG. 6 is a flowchart showing the operation at the time when the information processing apparatus 10 according to the embodiment of the present invention displays the home screen.

First, the structure of the example of the home screen displayed by the information processing apparatus 10 according to the present embodiment will be described by using FIG. 4. A home screen 2000 is a screen displayed by launching an application installed in the information processing apparatus 10. There is displayed on the background of the home screen 2000 photo content stored in any one of the content storage unit 106, the home server 20, and the content providing server 30. The photo content displayed on the background is randomly changed. For example, the photo content displayed on the background may be changed every time the user performs operation or may be changed at predetermined time intervals.

Moreover, there is displayed on the home screen 2000 icons 220 corresponding to respective content groups which the content group creation control unit 1103 has created by collecting content to be recommended for the user. In the case where a plurality of the content groups 220 are displayed, the plurality of the content groups 220 are displayed in a random arrangement so that the display positions of the content groups 220 do not affect user's selection of a content group. The content groups 220 in the present embodiment include various types of content and are created by using a variety of algorithms. In this manner, by arranging the content groups 220 so that the display positions thereof do not determine the priority of the selection, the content groups 220 with different attributes can be recommended for the user fairly and clearly, which thus allows for increase in user's freedom of selection.

It should be noted that icons 220 of FIG. 4 are illustrative of one way in which content groups can be represented. More generally, content group representations may include one or more of text, graphics, photos and video. Thus, for example, a content group may be represented by a graphic with descriptive text. For purposes of brevity, the various alternative representations that may be used to designate content groups may be collectively referred to as "icons."

When the user has input a content group re-creation instruction by pushing a next recommendation button 212, all of the plurality of content groups 220 displayed on the home screen 2000 are re-created and re-displayed. By this, the user can display the next candidates even when there is no desired content group 220 among the recommended content groups 220, which thus allows for increase in user's freedom of selection.

Moreover, buttons for switching screens are arranged on the top of the home screen 2000 and for example, a home button 202, a photo/video button 204, a music button 206, a player button 208, and a menu button 210 are displayed. By the home button 202 being pushed, a screen switches to the home screen. Moreover, by the photo/video button 204 being pushed, a screen switches to a display screen (not shown in figures) of a list of photo content and video content. By the music button 206 being pushed, a screen switches to a display screen (not shown in figures) of a list of music content. By the player button 208 being pushed, a screen switches to a player screen below, shown in FIG. 7. Moreover, also by the user selecting a content group, a screen switches to the player screen. Moreover, by the menu button 210 being pushed, a screen switches to a menu screen (not shown in figures).

Next, another example of the home screen displayed by the information processing apparatus 10 will be described by using FIG. 5. In addition, the home screen 2000 shown in FIG. 4 and a home screen 2100 shown in FIG. 5 are only different in display method, and thus description on the common points will be omitted.

The home screen 2100 is displayed by performing operation of forming the content groups 220 into lines, from the home screen 2000 shown in FIG. 4. The content groups 220 are randomly arranged on the home screen 2000, but the user sometimes wants to see the content groups 220 in lines. When the user performs the operation of forming the content groups 220 into lines in the situation where there is displayed the home screen 2000 on which the content groups 220 are randomly arranged, the content groups 220 are displayed in lines as shown in the home screen 2100. For each of the content groups 220, a thumbnail image and a creation logic therebelow are displayed.

Next, an operation of the information processing apparatus 10 at the time of displaying the home screen 2000 in FIG. 4 will be described by using FIG. 6. In the description, the functional units of the information processing apparatus 10 will be described by using reference numerals in FIG. 2.

First, the basic data acquisition unit 1102 obtains basic data for setting a content group creation logic (S102). The basic data includes date and time information, preference information and the like. Next, the content collection unit 1101 collects content (S104). The content collection unit 1101 collects content stored in the content storage unit 106, the home server 20, and the content providing server 30.

Next, the content group creation control unit 1103 sets an algorithm and a creation logic for content group creation (S106). This may include choosing an algorithm and setting the creation logic, randomly choosing an algorithm and randomly setting the creation logic, or setting an algorithm and randomly choosing the creation logic. In any event, the creation logic is what is described below the thumbnail of each of the content groups 220 in FIG. 5, for example. Here, the content group creation control unit 1103 may set the creation logic by using the basic data obtained by the basic data acquisition unit 1102. For example, a creation logic such as "photos and videos of August 2009" is set from the current date. Moreover, based on the preference information, a creation logic such as "currently recommended artists" may be set. At this time, in the case of creating the content group 220 based on the logic of "photos and videos of August 2009", an analysis algorithm for content metadata is used, for example. Moreover, in the case of creating the content group 220 based on the logic of "currently recommended artists", an analysis algorithm for preference information is used, for example. Other than those, in the case of using a creation logic of "music recommended for morning", for example, analysis of data itself may be performed by using a melody analysis algorithm (twelve-tone analysis).

Then, the content group creation control unit 1103 creates a content group by using the set algorithm based on the set creation logic (S108). For example, in the case where nine content groups are set to be provided for the user as shown in FIG. 4, the content group creation control unit 1103 determines whether to further create a content group (S110). The determination may be based on whether the content group creation has been performed for a predetermined number of times, for example. Then, in the case of further creating the content group 220, the content group creation control unit 1103 returns to the step S106 and repeats the processing from the step S106 to the step S108.

In the case where it is determined, in the step S110, not to create any more content group because of reaching the predetermined number of times, the output control unit 1104 causes the content groups 220 that have been created by then to be displayed on the home screen (S112).

Then, the user can select the provided content groups 220. Moreover, in the case where there is no content group 220 desired to be played among the provided content groups 220, the content groups can be re-created by pushing the next recommendation button 212.

Here, the content group creation control unit 1103 determines whether the user has input a content group re-creation instruction by pushing the next recommendation button 212 (S114), and in the case where the content group re-creation instruction has been input, the content group creation control unit 1103 returns to the step S106 and performs the processing of the step S106 to the step S112 again. If the user has not pushed the next recommendation button 212, whether there is a selection input of a content group is determined subsequently (S116). While the user does not perform the selection input of a content group, the home screen 2000 remains displayed. Then, when the user selects a specific content group from among the provided content groups, the output control unit 1104 plays the selected content group (S118). At this time, the output control unit 1104 causes the display device to display the player screen 3000 shown in FIG. 7, for example.

On the other hand, the feedback control unit 1105 updates the preference analysis database 108 based on information of the played content (S120).

As described above, when displaying the home screen 2000, the information processing apparatus 10 provides the content group in which the content to be recommended for the user is assembled. A plurality of types of content is included in the content group, which thus allows a discovery of content to progress more dynamically.

5. Operation for Player Screen Display of Information Processing Apparatus

Figure 7:
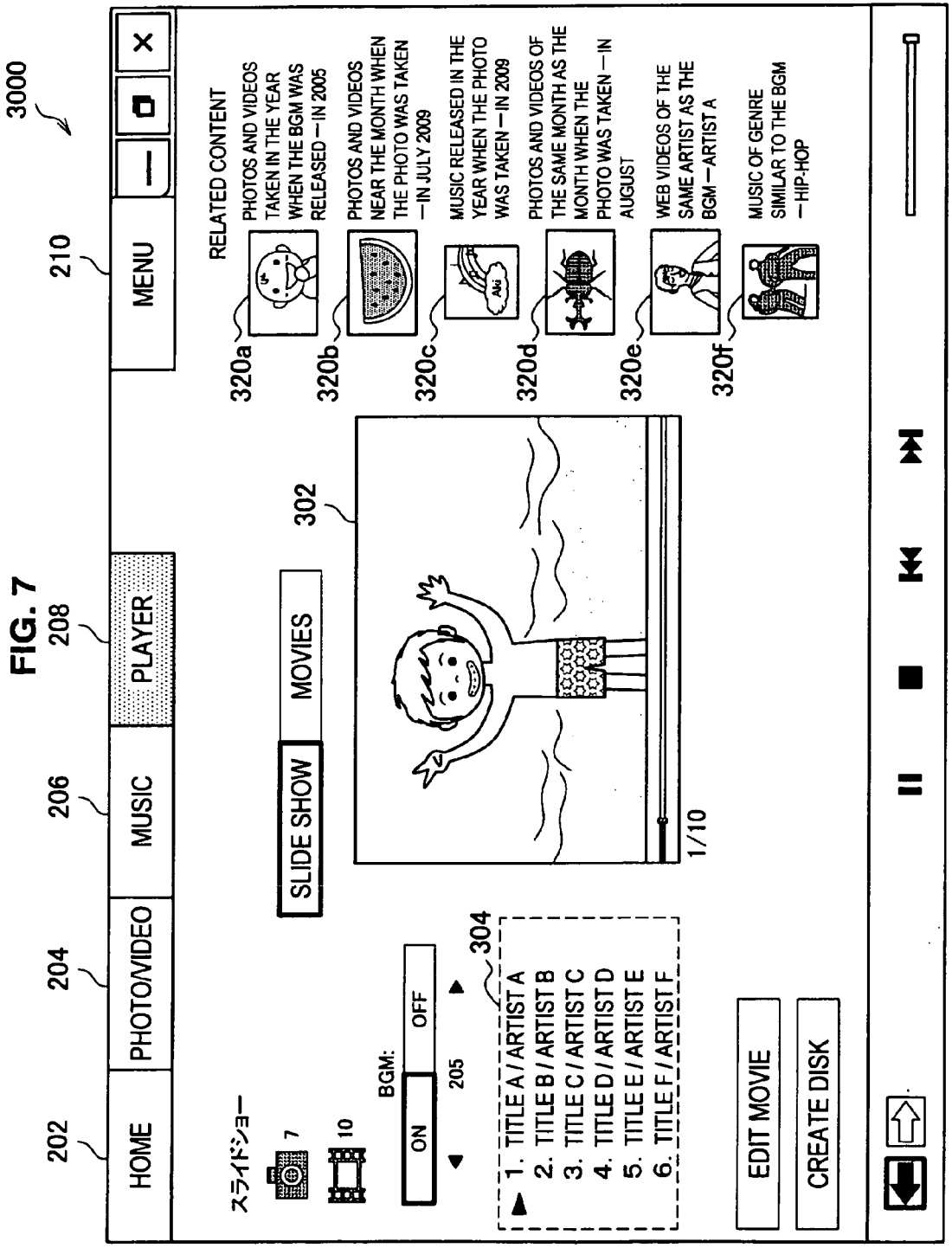
FIG. 7 is an explanatory diagram showing an example of a player screen displayed by the information processing apparatus according to the embodiment.
Figure 8:
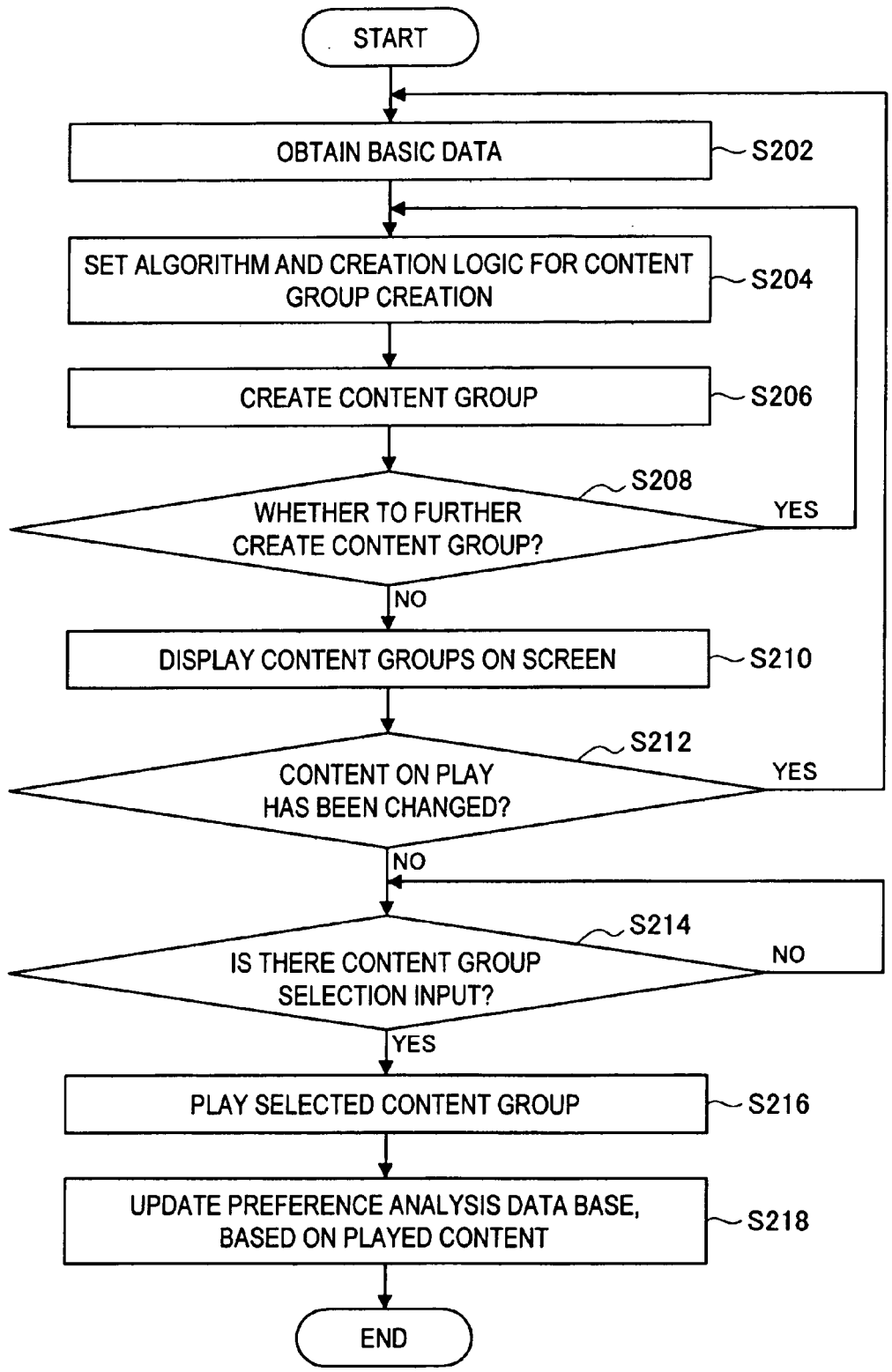
FIG. 8 is a flowchart showing an operation at the time when the information processing apparatus according to the embodiment displays the player screen.

Next, an operation at the time when the information processing apparatus 10 displays the player screen will be described by using FIG. 7 and FIG. 8. FIG. 7 is an explanatory diagram showing an example of the player screen displayed by the information processing apparatus according to the embodiment of the present invention. Moreover, FIG. 8 is a flowchart showing the operation at the time when the information processing apparatus according to the embodiment of the present invention displays the player screen.

First, the example of the player screen displayed by the information processing apparatus 10 according to the present embodiment will be described. In addition, menus for switching screens displayed on the top of the screen are the same as those in FIG. 4 and thus are denoted with the same reference numerals, and thereby a description thereof will be omitted.

FIG. 7 assumes a situation where the user selects a content group 220c (refer to the reference numeral in FIG. 5) from the content groups 220 displayed on the home screen 2000 in FIG. 4.

At this time, on the player screen 3000, photo content 302 which is main content is displayed in a slide show. Moreover, music content as sub-content is played as BGM. Here, the main content is content which the user mainly views and/or listens to. For example, the main content may be content played by being selected by the user. Moreover, for example, the main content may be defined as content displayed occupying the major part of the screen display. Moreover, the sub-content is content provided for the user at the same time as the main content, which is a different type of content from the main content.

Currently, a music content group 304 is played as the sub-content. At this time, there are displayed in a mix on a related content column on the extreme right, content groups 320 related to the photo content 302 which is the main content and content groups 320 related to a "title A" which is the content on play among the music content group 304 which is the sub-content.

Here, when the playback of the "title A" among the music content group 304 is completed and a "title B" is played subsequently, the plurality of content groups 320 displayed as the related content are changed to those including content groups related to the "title B" which is the music content on play. Moreover, similarly, in the case where the played content is changed by a user's operation, the plurality of content groups 320 displayed as the related content are changed to those including content groups related to the content on play, for example.

Here, each of the plurality of content groups 320 displayed as the related content has been created based on the creation logic set at the time when the content group was created. For example, a content group 320a is a content group created based on a creation logic of "photos and videos taken in the year when the BGM was released". The creation logic is, in other words, "photos and videos taken in 2005". Even while the user views the photos of the main content, by hearing a music in BGM, the user may unexpectedly recall the time when the music was heard throughout the town. At such a time, the user may be interested in photos and videos taken at the time which the user recalls if they are displayed as the related content. Accordingly, the content group created by using the creation logic related to the sub-content is provided as the related content.

Moreover, a content group 320b is a content group created based on a creation logic of "photos and videos near the month when the main content was taken". If further specified, the creation logic is "photos and videos taken in July 2009".

As described above, the creation logic may be related to the main content or may be related to the sub-content. Moreover, content to be selected may be photo content, music content, video content, news content or product information content, for example. By the plurality of content being recommended in parallel in this manner, there is an effect that the user has a better chance to find desired content. Moreover, by the plurality of content being proposed in the form of a package as the content group, the user has a further better chance to find desired content.

Next, the operation of the information processing apparatus 10 at the time of displaying the player screen 3000 in FIG. 7 will be described by using FIG. 8. In the description, the functional units of the information processing apparatus 10 will be described by using the reference numerals in FIG. 2.

First, it is premised that the processing in the flowchart in FIG. 6 has been performed, that content has been collected, and that content or a content group to be played has been selected.

First, the basic data acquisition unit 1102 obtains basic data (S202). The basic data includes date and time information, preference information, and metadata of the content on play, for example.

Then, the content group creation control unit 1103 sets an algorithm and a creation logic for creating a content group (S204). This may include choosing an algorithm and setting the creation logic, randomly choosing an algorithm and randomly setting the creation logic, or setting an algorithm and randomly choosing the creation logic. In any event, the creation logic may be related to the main content. Moreover, the creation logic may be related to the sub-content. Moreover, in the case of providing the plurality of content groups 320 at a time, as shown in FIG. 7, the content group creation control unit 1103 may set creation logics so that the plurality of content groups 320 include content groups created based on creation logics related to the main content and content groups created based on creation logics related to the sub-content. Moreover, concerning the algorithm, a variety of algorithms such as a metadata analysis algorithm, an analysis algorithm for preference information, and a melody analysis algorithm can be used, as described in the operation at the time of displaying the home screen 2000.

Then, the content group creation control unit 1103 creates a content group by using the set algorithm based on the set creation logic (S206). For example, as shown in FIG. 7, in the case where six content groups are set to be provided as the related content for the user, the content group creation control unit 1103 determines whether to further create a content group (S208). Then, in the case of further creating a content group, the content group creation control unit 1103 returns to the step S204 and repeats the processing from the step S204 to the step S206.

In the case where it is determined, in the step S208, not to create any more content group because of reaching a predetermined number of times, the output control unit 1104 causes the content groups that have been created by then to be displayed on the player screen 3000 (S210).

Through the processing described above, the content groups 320 are displayed as the related content on the player screen 3000 as shown in FIG. 7. While in this state, in the case where music content played as BGM is changed to the next music, so that the content on play is changed, or in the case where content on play is changed according to a user's operation, the content group creation control unit 1103 determines whether the content on play has been changed (S212), and in the case the content on play has been changed for the reason such as above, the content group creation control unit 1103 returns to the step S202. Then, the processing from the step S202 to the step S210 is repeated. At this time, in the basic data acquisition step of the step S202, the basic data acquisition unit 1102 obtains metadata of the changed content on play.

Then, in the case where it is determined in the step S212 that the content on play has not been changed, the output control unit 1104 determines whether the user has performed a selection input of a content group (S214), and if it is detected that the user has performed the selection input of a content group, the output control unit 1104 plays the selected content group (S216). On the other hand, the feedback control unit 1105 updates the updates the preference analysis database 108 based on information of the played content (S218).

As described above, the information processing apparatus 10 according to the present embodiment equally handles the plurality of different types of content, selects an optimal algorithm from among the plurality of types of algorithms, and provides for the user the content in the form of a package as the content group in which the content to be recommended for the user is assembled from the plurality of types of content. At this time, the content group includes the plurality of types of content. Accordingly, there is an effect that user's freedom of selection increases. At this time, the content group may be provided for the user, being displayed on the screen display along with the thumbnail image of the content group and the text indicating the creation logic of the content group. The user can be informed of the content of the content group by seeing the text indicating the creation logic or the image.

Moreover, on the player screen, content groups related to both of the main content and the sub-content are provided as the related content. In the related art, even in the case where main content and sub-content are provided at the same time, only the content related to the main content was provided. However, the user should sometimes potentially have an interest in content related to the sub-content, and the present invention meets that need.

Although the preferred embodiments of the present invention have been described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, in the aforementioned embodiment, the main content is the photo content and the sub-content is the music content, but the present invention is not limited thereto. For example, the main content may be music content and the sub-content may be photo content. Moreover, it is possible that the main content is video content and the sub-content is photo content.

Moreover, for example, in the aforementioned embodiment, also in the case of playing the content obtained from the content providing server 30, the playback is performed on the same player screen, but the present invention is not limited to such example. For example, the content obtained from the content providing server 30 may be played by launching a separate browser.

In addition, in the present specification, the steps described in the flowcharts include not only processing steps carried out in time series in the described order but also processing steps carried out in parallel or individually and not necessarily in time series. Moreover, the order of the processing steps carried out in time series can be also appropriately changed in some cases, of course.

What is claimed is:

1. An information processing apparatus comprising:
   at least one processor configured to
       control to create a plurality of image content groups based on creation logics different from each other; and
       control to provide the plurality of image content groups to a user, the plurality of image content groups including a first image contents group including a plurality of image contents which are provided to the user at the same time,
   wherein the processor provides an image content superimposed on at least one of the plurality of image content groups, wherein when a particular image content is selected from the plurality of image contents included in the first image contents group created based on a first creation logic, the processor controls to display the particular image content and a plurality of sub-contents related to the particular image content, and wherein the plurality of sub-contents indicate product information and are created based on a second creation logic different from the first creation logic.

2. The information processing apparatus according to claim 1, wherein the processor refreshed at least one of the provided content groups based on user operation.

3. The information processing apparatus according to claim 1, wherein the image content is changed based on user operation.

4. The information processing apparatus according to claim 1, wherein the image content is automatically changed at predetermined time intervals.

5. The information processing apparatus according to claim 1, wherein the plurality of content groups are displayed in a random arrangement.

6. The information processing apparatus according to claim 1, wherein a respective creation logic for at least one of the plurality of content groups is displayed at a region adjacent to the corresponded content group.

7. The information processing apparatus according to claim 1, wherein the creation logics for the plurality of content groups are created based on algorithms different from each other.

8. The information processing apparatus according to claim 1, wherein the plurality of content groups have different categories from each other.

9. The information processing apparatus according to claim 1, wherein the processor is configured to recommend the plurality of sub-contents for the user.

10. The information processing apparatus according to claim 1, wherein the processor is configured to control to display the particular image content and the plurality of sub-contents such that display size of the particular image content is larger than display size of each of the plurality of sub-contents.

11. A method for use with an information processing apparatus having at least one processor, said method comprising:
creating, by use of the at least one processor, a plurality of image content groups based on creation logics different from each other;
providing, by use of the at least one processor, the plurality of image content groups to a user, the plurality of image content groups including a first image contents group including a plurality of image contents which are provided to the user at the same time;
providing, by use of the at least one processor, an image content superimposed on at least one of the plurality of image content groups; and
when a particular image content is selected from the plurality of image contents included in the first image contents group created based on a first creation logic, causing, by use of the at least one processor, the particular image content and a plurality of sub-contents related to the particular image content to be displayed, and
wherein the plurality of sub-contents indicate product information and are created based on a second creation logic different from the first creation logic.

12. The method according to claim 11, further comprising refreshing at least one of the provided content groups based on user operation.

13. The method according to claim 11, further comprising changing the image content based on user operation.

14. The method according to claim 11, further comprising automatically changing the image content at predetermined time intervals.

15. The method according to claim 11, further comprising displaying the plurality of content groups in a random arrangement.

16. The method according to claim 11, further comprising displaying a respective creation logic for at least one of the plurality of content groups at a region adjacent to the corresponded content group.

17. The method according to claim 11, wherein the creation logics for the plurality of content groups are created based on algorithms different from each other.

18. The method according to claim 11, wherein the plurality of content groups have different categories from each other.

19. A computer-readable non-transitory medium having stored thereon a program for use with at least one processor of an information processing apparatus which when executed causes the at least one processor to
control to create a plurality of image content groups based on creation logics different from each other; and
control to provide the plurality of image content groups to a user, of the plurality of image content groups including a first image contents group including a plurality of image contents which are provided to the user at the same time,
wherein the at least one processor provides an image content superimposed on at least one of the plurality of image content groups,
wherein when a particular image content is selected from the plurality of image contents included in the first image contents group created based on a first creation logic the at least one processor controls to display the particular image content and a plurality of sub-contents related to the particular image content, and
wherein the plurality of sub-contents indicate product information and are created based on a second creation logic different from the first creation logic.

20. An information processing apparatus comprising:
at least one processor configured to
control to create a plurality of image content groups based on creation logics different from each other; and
control to provide the plurality of image content groups including a first image content group to a user, the first image content group created based on a first creation logic and including a plurality of image contents which are provided to the user at the same time,
wherein response to selection of a first image content from the plurality of image contents, the processor is configured to control to display the first image content and a plurality of sub-contents related to the first image content, and
wherein the plurality of sub-contents indicate product information and are created based on a second creation logic different from the first creation logic.

* * * * *